US010352307B2

(12) United States Patent
Kellogg et al.

(10) Patent No.: US 10,352,307 B2
(45) Date of Patent: Jul. 16, 2019

(54) MODULAR POWER GENERATOR

(71) Applicants: Joseph Lawrence Kellogg, Moultonborough, NH (US); Mingming Guo Kellogg, Moultonborough, NH (US)

(72) Inventors: Joseph Lawrence Kellogg, Moultonborough, NH (US); Mingming Guo Kellogg, Moultonborough, NH (US)

( * ) Notice: Subject to any disclaimer, the term of this patent is extended or adjusted under 35 U.S.C. 154(b) by 75 days.

(21) Appl. No.: 15/067,051

(22) Filed: Mar. 10, 2016

(65) Prior Publication Data

US 2016/0195073 A1    Jul. 7, 2016

Related U.S. Application Data

(63) Continuation-in-part of application No. 14/476,878, filed on Sep. 4, 2014, now abandoned.

(51) Int. Cl.
| | |
|---|---|
| *F03G 7/06* | (2006.01) |
| *F04B 1/06* | (2006.01) |
| *F04B 17/00* | (2006.01) |
| *F04B 23/06* | (2006.01) |
| *H02K 7/18* | (2006.01) |
| *F04B 1/02* | (2006.01) |

(52) U.S. Cl.
CPC ............ *F03G 7/065* (2013.01); *F04B 1/02* (2013.01); *F04B 1/06* (2013.01); *F04B 17/00* (2013.01); *F04B 23/06* (2013.01); *H02K 7/1807* (2013.01)

(58) Field of Classification Search
CPC .... F03G 7/065; F04B 1/06; F04B 1/02; F04B 17/00; F04B 23/06; H02K 7/1807
USPC .......................................... 60/325, 527–529
See application file for complete search history.

(56) References Cited

U.S. PATENT DOCUMENTS

| | | | | | |
|---|---|---|---|---|---|
| 3,833,248 | A | * | 9/1974 | Wossner | B60R 19/32 188/282.9 |
| 3,986,354 | A | * | 10/1976 | Erb | F03G 7/00 417/321 |
| 5,079,920 | A | * | 1/1992 | Whitehead | F03G 7/065 60/527 |
| 5,622,482 | A | * | 4/1997 | Lee | F03G 7/065 417/321 |
| 7,052,251 | B2 | * | 5/2006 | Nason | A61M 5/14244 417/321 |
| 2005/0192561 | A1 | * | 9/2005 | Mernoe | A61M 5/14216 604/890.1 |

* cited by examiner

*Primary Examiner* — Hoang M Nguyen
(74) *Attorney, Agent, or Firm* — Eversheds Sutherland (US) LLP

(57) ABSTRACT

A modular power generator is provided. In some embodiments, the modular power generator can utilize or otherwise leverage one or more harvesting modules, each consisting of one or more nitinol elements, to harvest low grade thermal energy, converting it into high grade mechanical energy. The mechanical energy can be decoupled from the power generator by a mechanical energy storage mechanism, an energy transfer mechanism, and a control mechanism. Stored mechanical energy can be utilized on demand or asynchronously with respect to the generation of the mechanical energy.

19 Claims, 12 Drawing Sheets

MODULAR POWER GENERATOR

CROSS-REFERENCE TO RELATED APPLICATION

This PCT application claims priority from U.S. patent application Ser. No. 15/067,051, filed Mar. 10, 2016, which is a continuation-in-part of U.S. patent application Ser. No. 14/476,878, filed Sep. 4, 2014.

BACKGROUND

Conventional power generation can rely on or otherwise leverage shape memory alloys. While thermal and Carnot efficiencies of a heat engine that utilizes shape memory alloys can be much lower than those of traditional power plants, such a heat engine can operate over a relatively small temperature range, thus utilizing low-grade heat for the generation of high-grade power. As such, effective reliance on heat that would be conventionally understood as heat refuse can render heat engines based on shape memory alloys desirable despite cost of materials and low efficiencies. More specifically, nitinol is one of several alloys that are known as either shape memory alloys (SMA) or thermoelastic materials, and has been leverage in conventional heat engines. Yet, some of the conventional heat engines that leverage nitinol may require that power be consumed in order to generate energy. Some other ones of the conventional heat engines may require that the generated power is to be used upon generation. Still some other ones of the conventional heat engines that leverage SMAs can convert low grade heat into mechanical energy utilizing multiple shape memory springs. Further, some other conventional heat engines have leveraged the fact that nitinol exhibits efficient phase-transition pathways under uniaxial tension and, thus, have included a single nitinol element held in tension. Despite the availability of such conventional heat engines, much remains to be developed in the field of heat engines based on shape memory alloys.

BRIEF DESCRIPTION OF THE DRAWINGS

The accompanying drawings are an integral part of the disclosure and are incorporated into the present specification. The drawings illustrate example embodiments of the disclosure and, in conjunction with the description and claims, serve to explain, at least in part, various principles, features, or aspects of the disclosure. Certain embodiments of the disclosure are described more fully below with reference to the accompanying drawings, which are not drawn to scale. However, various aspects of the disclosure can be implemented in many different forms and should not be construed as being limited to the implementations set forth herein. Like numbers refer to like, but not necessarily the same or identical, elements throughout.

DETAILED DESCRIPTION

Figure 1:
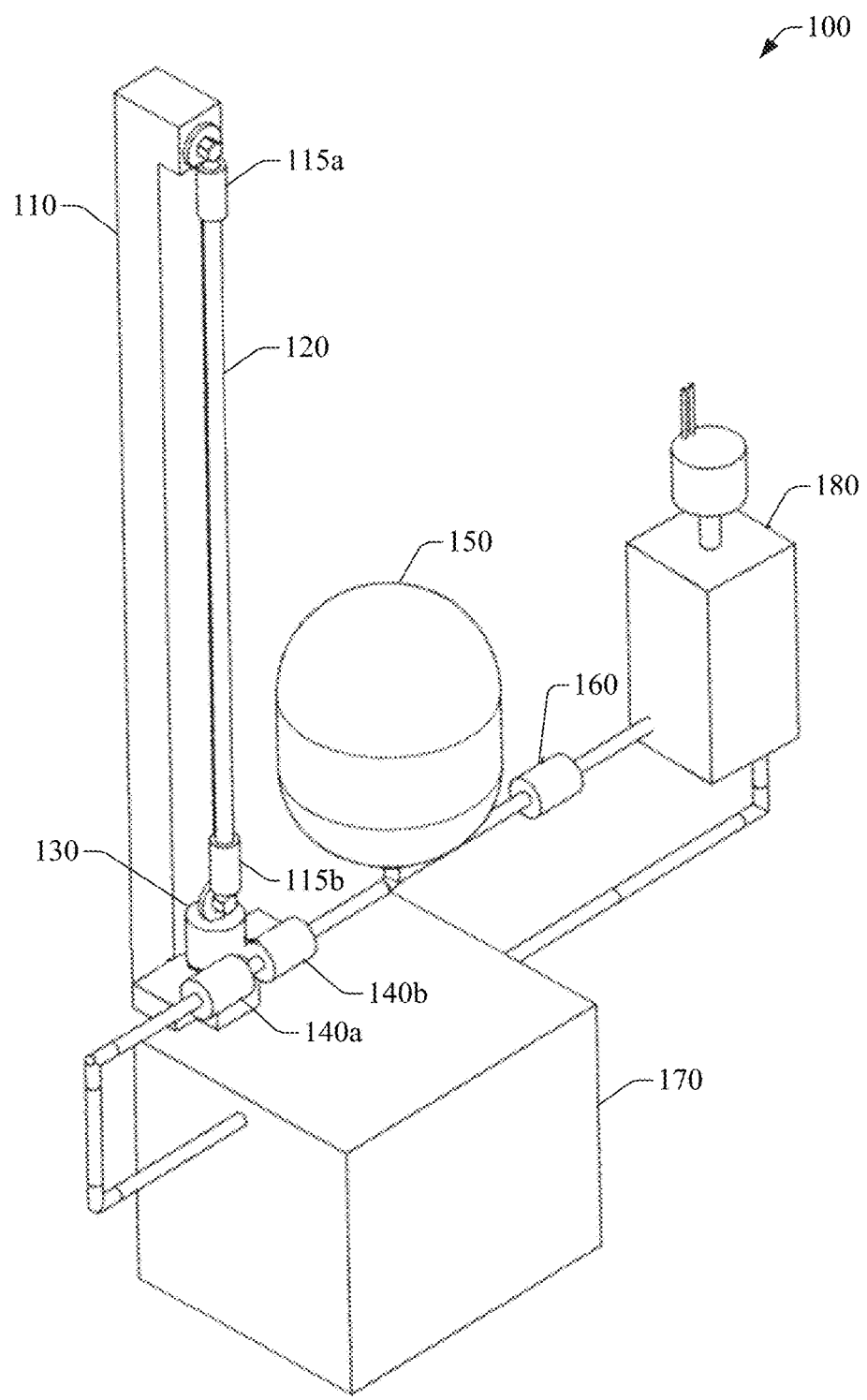
FIG. 1 illustrates a perspective view of an example of a modular power generator in accordance with one or more embodiments of the disclosure.

The disclosure recognizes and addresses, in at least certain aspects, the issue of power generation based on phase transitions in memory shape alloys and other thermoelastic materials. As mentioned, nitinol is one of several alloys that are known as either shape memory alloys (SMA) or thermoelastic materials. SMAs work because of the presence of multiple solid state phases or crystal structures that have dramatically different properties. Usually, one structure will have bonds that can rotate easily without being broken and the other will be very rigid. The existence of these two structures allow for a restoration of an apparently plastic deformation just by changing the temperature of the material. Stated in other words, a shape memory alloy or a thermoelastic material in a heat engine can convert low-grade thermal energy into high-grade mechanical energy. The disclosure provides modular power generators that utilize shape memory alloy members or other thermoelastic material members that can produce a linear output for the generation of thermodynamic work. The modular power generators of this disclosure permit or otherwise facilitate the decoupling of power generation elements from energy transfer elements and energy storage elements. In addition, the modular power generators can include control mechanisms that permit or otherwise facilitate the utilization of generated power on demand.

More specifically, yet not exclusively, the disclosure provides apparatuses, systems, and/or techniques for power generation based on modular power generators that leverage shape memory alloys and/or other thermoelastic materials. As described in greater detail below, in at least some embodiments, the disclosure provides a module for the collection (or harvesting) of elastic energy from a shape memory alloy or a thermoelastic material in response to a transition from a first tensile state to a second tensile state of the material. The elastic energy can be converted to mechanical energy at a hydraulic cylinder or another type of mechanism that can retain potential energy (e.g., restorative potential energy, gravitational potential energy, or the like). The mechanical energy retained in a pressurized fluid can be accumulated or otherwise retained in a storage module, such as a pressure storage vessel (including for example, hydraulic accumulators, bladders, and the like). While aspects of modular power generators of this disclosure are illustrated with reference to shape memory alloys, the disclosure is not limited in this respect and a member (e.g., a rod, a wire, or another type of member elongated along a defined axis) formed from a thermoelastic material can be utilized or otherwise leveraged. More specifically, example thermoelastic materials that can be utilized include binary alloys that exhibit shape memory effect, such as gold-cadmium alloys, titanium-niobium alloys; ternary alloys that exhibit shape memory effect, such as aluminum-copper-zinc; polymers that exhibit shape memory effect (which are generally referred to as shape memory polymers (SMPs)), such as light-induced SMPs, electro-active SMPs (carbon nanotubes, magnetite nanoparticles, or the like), and the like. Further, while specific combinations of harvesting module(s) and other modules of this disclosure are relied on for the sake of clarity of description, the disclosure is not limited to the described combination and other combinations of harvesting module(s) and storage module(s), for example, can be implemented in accordance with aspects described herein.

Embodiments of the disclosure can provide numerous improvements over conventional power generators that utilize shape memory alloys or other thermoelastic materials. One example improvement is that modular power generators of the disclosure have greater mechanical efficiency because frictional losses and other losses are reduced by reducing the number of parts or other components present in the generators. Another example improvement includes the decoupling of the energy harvesting mechanism from the power generation mechanism. Thus, in at least some scenarios, power can be generated steadily, (e.g. at an even continuous rate), rather than in bursts associated with the shape memory effect that permits the conversion of thermal energy into elastic energy. As such, power can be controllably utilized. Yet another improvement includes the scalability and straightforward customization of a modular power generator to a defined application.

With reference to the drawings, FIG. 1 presents a perspective view of an example of a modular power generator 100 in accordance with at least certain embodiments of the disclosure. The modular power generator 100 can include a harvesting module 110 that includes a shape memory alloy member 120 having a proximal end and an opposing distal end. As illustrated, the shape memory alloy member 120 can be elongated along a longitudinal axis that can define a direction for linear displacement and generation of power in accordance with aspects described herein. The shape memory alloy member 120 can be crystalline and the longitudinal axis oriented along a <1,0,0> crystalline direction or any other crystallographic direction of the shape memory alloy member 120. In some embodiments, the shape memory alloy member 120 can have cylindrical symmetry or other types of symmetry about the longitudinal axis. For instance, the shape memory alloy member 120 can be embodied in a rod having a diameter in the range from about 1.0 mm to about 8.0 mm, and wherein the rod has a length in the range from about 100.0 mm to about 500.0 mm (e.g., 100.0 mm, 175.0 mm, 200.0 mm, 300.0 mm, 400.0 mm, 500.0 mm). The disclosure is not limited to such example lengths, and the shape memory alloy member 120 can have shorter or longer lengths.

In some aspects, the modular power generator 100 can leverage or can otherwise rely on a transition to a tensile state of the shape memory alloy member 120 for generation of power in accordance with aspects of this disclosure. The shape memory alloy member 120 can have constituents and respective concentrations that can yield at least one transition to a respective tensile state of the shape memory alloy member 120. A transition of the at least one transition (or, in some embodiments, each of the at least one transitions) can correspond to a thermodynamic phase transition between a first specific atomic structure to a second defined atomic structure, each of such atomic structures having a tensile state (which can include, in some instances, an essentially relaxed state, (e.g., a zero-strain state)). As such, in some instances, the transition can cause the shape memory alloy member to transition from a first tensile state to a second tensile state, resulting in a contraction of the shape memory alloy member 120. In some aspects, the contraction can correspond to a defined percentage of the length of the shape memory alloy member 120 along the longitudinal axis thereof. In terms of atomic displacement, in scenarios in which the shape memory alloy member 120 is crystalline, such a contraction corresponds to a reduction, by the defined percentage, of a lattice parameter along the crystalline direction (e.g., <1,0,0> or, in some other embodiments, a general direction <k,l,m>, where k, l, m can be Miller indices) of the shape memory alloy member 120.

Constituents and respective concentrations of an alloy that forms or is otherwise included in the shape memory alloy member 120 can determine transition temperatures at which the shape memory alloy member 120 can transition between tensile states. Thus, the shape memory alloy member 120 can be configured to transition to a tensile state at a defined transition temperature. In some embodiments, the shape memory alloy member 120 can be formed from or can include a nickel-titanium alloy. Adjusting the concentrations of Ni and Ti can yield, for example, a transition temperature in a range from about −100 degrees Celsius to about 160 degrees Celsius, with a thermal hysteresis ranging from eleven to more than one hundred degrees Celsius. Specifically, in some instances, such concentrations can be adjusted to yield transition temperatures that can range from about 5 degrees Celsius to about 30 degrees Celsius. Thus, numerous operational conditions and environments can be addressed by relying on Ni—Ti alloys for generation of electricity in accordance with aspects of this disclosure. For instance, a first Ni—Ti alloy may be utilized in the shape memory alloy member 120 to permit power generation during an Antarctic winter, with temperatures below about −50 degrees Celsius, and a second Ni—Ti alloy may be utilized to permit power generation in some deserts where temperatures are as elevated as 80 degrees Celsius in direct sunlight. Less extreme implementations can leverage concentrations of Ni and Ti that yield a transition temperature in a range from about 5 degrees Celsius to about 30 degrees Celsius. In other embodiments, the shape memory alloy member 120 can be formed from or can include a nickel-copper-titanium alloy. For instance, copper can substitute nickel and the concentration of copper can be at most about 20%. Such ternary alloys can provide greater flexibility in achieving a desired transition temperature, altering thermal properties of the material, and/or altering the mechanical properties of the material.

Figure 2:
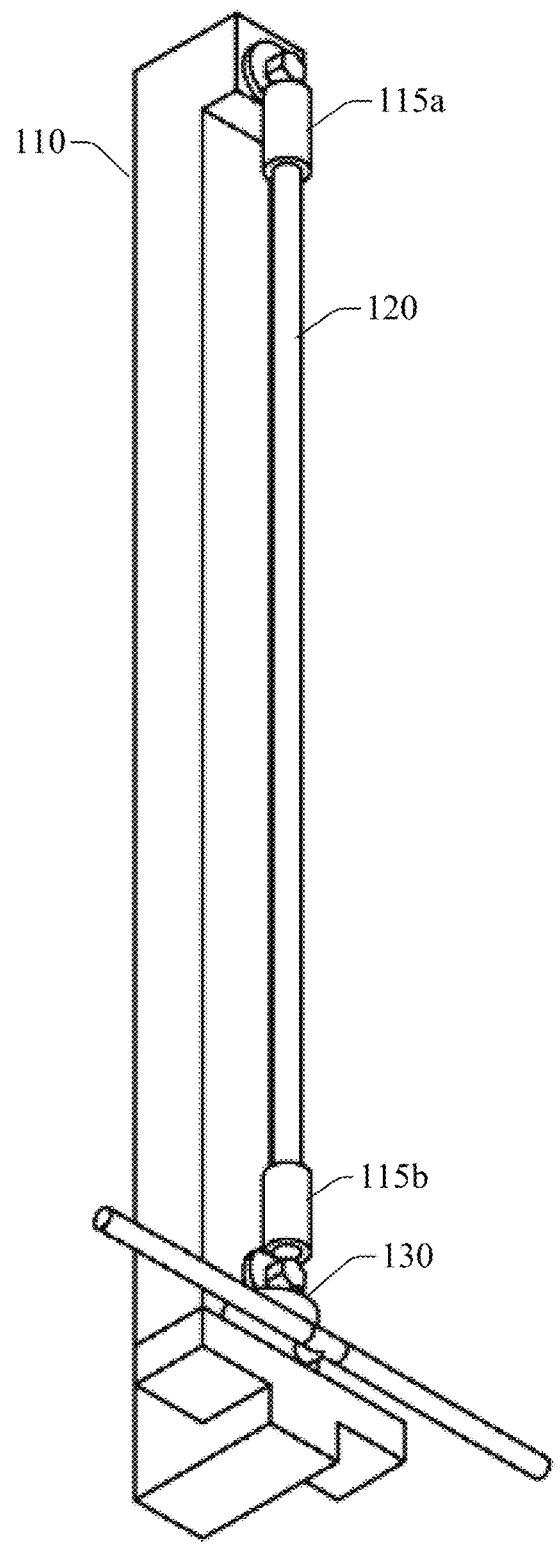
FIG. 2 illustrates a perspective view of an example of a module that can be utilized in a modular power generator in accordance with one or more embodiments of the disclosure.
Figure 3:
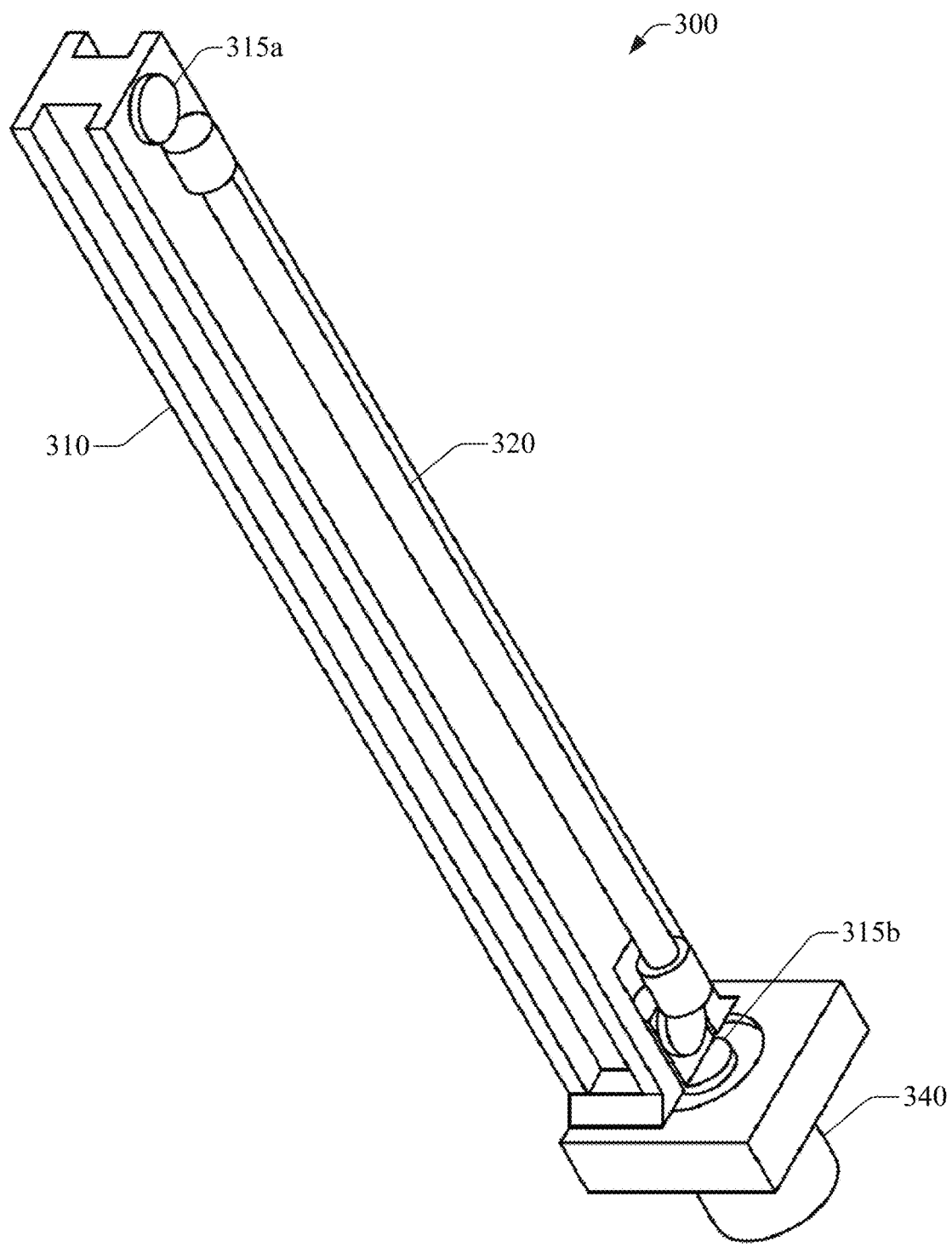
FIG. 3 illustrates a perspective view of another example of a module that can be utilized in a modular power generator in accordance with one or more embodiments of the disclosure.

In some aspects, in order to leverage a transition between tensile states of the shape memory alloy member 120, a first end (which may be referred to as a distal end) of the shape memory alloy member 120 can be mechanically coupled to the harvesting module 110. In addition, the harvesting module 110 includes a mechanism mechanically coupled (e.g., soldiered, bolted, or otherwise affixed) to a second end (which may be referred to as a proximal end) of the shape memory alloy member 120. Such a second end can move along the longitudinal axis of the shape memory alloy member 120. More specifically, as illustrated in FIG. 1, the harvesting module 110 includes a rigid support member, where a first ring terminal 115a is rigidly affixed to an end of the rigid support member and a second ring terminal 115b is rigidly affixed to the second end of the shape memory alloy member 120. The rigid support member, in some instances, can be machined or otherwise manufacture from a plastic or metal. In one example, the first ring terminal 115a can include a titanium alloy and can be laser soldered to the first end of the shape memory alloy member 120 and to the rigid support member. In addition or in another example, the second ring terminal 115b can include a titanium alloy and can be laser soldered to the second end of the shape memory alloy member 120. For the sake of clarity, FIG. 2 illustrates the harvesting module 110. Further, FIG. 3 illustrates an example harvesting module 300 that can be assembled in the modular power generator 100 or other type of modular power generators in accordance with aspects of the disclosure. As illustrated, the example harvesting module 300 includes a rigid support member 310, which can be machined or otherwise manufactured from a plastic or metal. In addition, an end 315a (which may be referred to a distal end) of a shape memory alloy member 320 (e.g., a nitinol rod or another Ni—Ti alloy rod) can be rigidly affixed (e.g., laser soldered) to the rigid support member 310. A second end 315b of the shape memory alloy member 320 can be rigidly affixed (e.g., laser soldered) or otherwise mechanically coupled to a mechanism included within a hydraulic cylinder 340. The second end 315b opposes the first end 315a and can move along a longitudinal axis of the shape memory alloy member 320.

With further reference to FIG. 1, in some embodiments, the mechanism can be included in a hydraulic cylinder 130 (which can be embodied in a single-acting hydraulic cylinder) and can include a piston (or, in some embodiments, a plate or a slab; not depicted) configured to move in response to the shape memory alloy member 120 transitioning to a tensile state at a defined transition temperature. The movement of the piston can reduce a volume of an amount of fluid within the hydraulic cylinder, resulting in a first amount of pressurized fluid within the hydraulic cylinder 130. The modular power generator 100 can include a vessel 170 (or another type of enclosure or reservoir) that can supply unpressurized fluid to the hydraulic cylinder 130. To that end, in one aspect, the modular power generator 100 can include a valve 140a coupled (e.g., mechanically and fluidically coupled) to the vessel 170. The valve 140a can be configured to release an amount (metered or otherwise) of unpressurized fluid to the hydraulic cylinder 130.

By pressuring an amount of fluid within the hydraulic cylinder 130, the piston of the mechanism included in the hydraulic cylinder 130 can transfer the elastic energy associated with the deformation (e.g., contraction) of the shape memory alloy member 120 to the amount of pressurized fluid. As such, in one aspect, the fluid within the hydraulic cylinder 130 can be utilized as a medium to transfer the thermodynamic work generated by the shape memory alloy member 120 to energy storage. To that end, the modular power generator 100 can include a pressure storage vessel 150 configured to receive at least a portion of the amount of pressurized fluid. The pressure storage vessel 150 can be embodied in, for example, a hydraulic accumulator and can contain pressurized fluid at a defined operating pressure (e.g., about 15,000 psi). In addition, the pressure storage vessel 150 can receive at least a portion of the amount of pressurized fluid via an inlet opening (not depicted) of such a vessel. The inlet opening can be mechanically coupled and/or fluidically coupled to a valve 140b via a conduit, such as a pipe, a hose, or other flexible or non-flexible tubing. As illustrated, the valve 140b also can be mechanically and/or fluidically coupled to an outlet opening (not depicted) of the hydraulic cylinder 130, the valve 140b configured to release the amount of pressurized fluid.

The modular power generator 100 also can include a valve 160 that can release pressurized fluid to an electric power generator 180 (e.g., a DC generator coupled to a hydraulic motor). The pressurized fluid can be released controllably in response to, for example, a power consumption criterion being satisfied. In some embodiments, a control unit (e.g., a programmable logic controller or another type of computing device; not depicted) can control the release of the pressurized fluid. To that end, in some implementations, the control unit can implement logic (e.g., execute computer-accessible instructions) to determine that the power consumption criterion is satisfied. In response, the control unit can direct or otherwise cause the valve 160 to open for the release of pressurized fluid. In addition or in other embodiments, a mechanism can passively control the opening (and shutting) of the valve for the release of the second amount of pressurized fluid.

The pressure storage vessel 150, the valve 140b, and/or the valve 160 can embody or can constitute an energy storage module within the modular power generator 100. By being configured (e.g., assembled and/or manufactured) to accumulate and controllably release pressurized fluid in accordance with aspects of this disclosure, the energy storage module can supply a steady non-pulsed stream of usable power to the electric generator 180.

From the description herein, the separation between energy collection, energy transfer, and energy storage, and associated modularity of the modular power generator 100 becomes readily apparent. In some aspects, such a separation permits generation of power without consumption of the generated power upon generation thereof. As such, the elastic energy that can be collected from the cyclical structural transitions (e.g., martensitic transformations) in the shape memory alloy member 120 can be stored for consumption on-demand.

Figure 4:
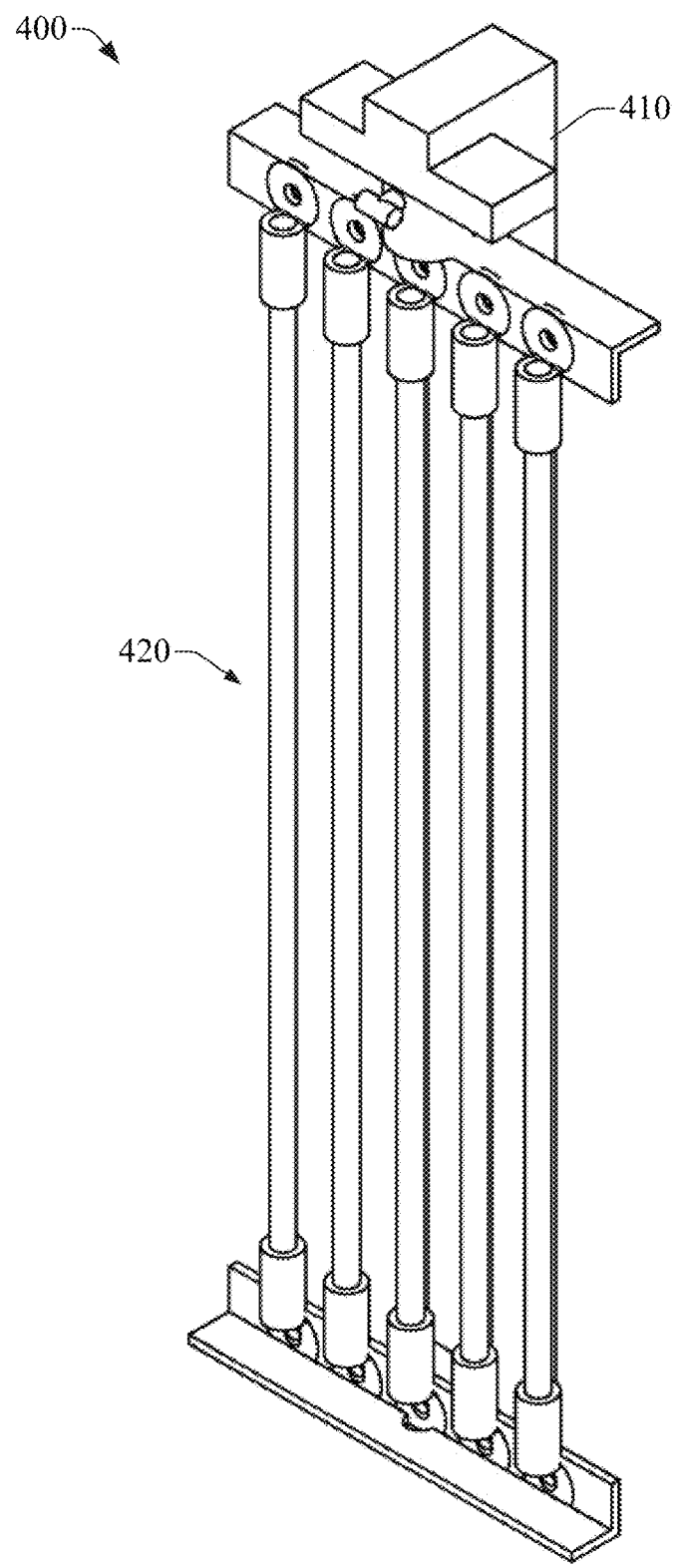
FIG. 4 illustrates a perspective view of another example module that can be utilized in a modular power generator in accordance with one or more embodiments of the disclosure.
Figure 5:
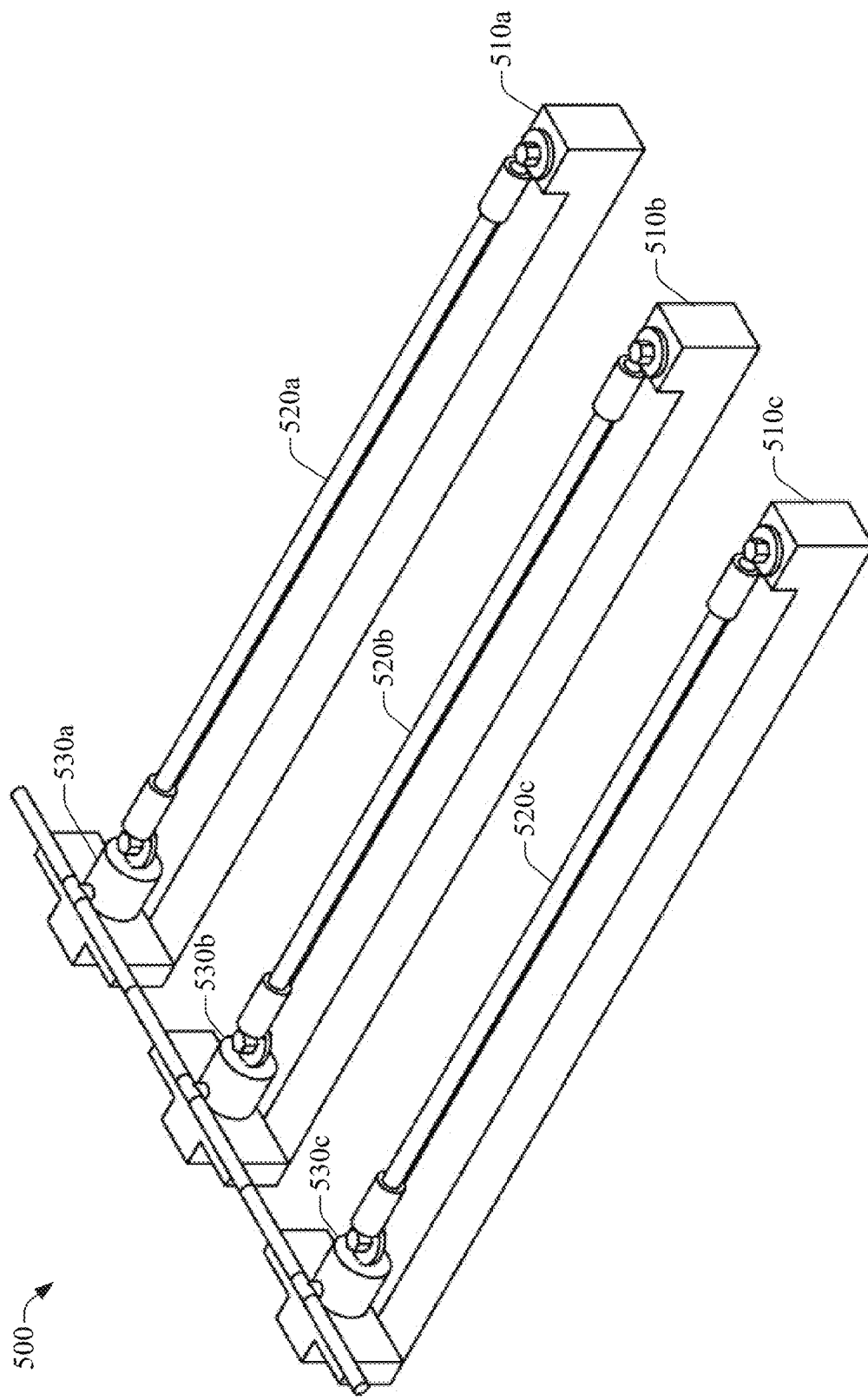
FIG. 5 illustrates an example of a multi-module assembly that can be utilized in a modular power generator in accordance with one or more embodiments of the disclosure.

While a single shape memory alloy member 120 is shown in the modular power generator 100, the disclosure is not limited in that respect. Modular power generators in accordance with aspects of this disclosure can be scalable in at least two ways. In one example, multiple shape memory alloy members can be assembled within a harvesting module. Specifically, FIG. 4 illustrates an example harvesting module 400 having five shape memory alloy members 420 mounted to or otherwise integrated into a rigid support member 410. Similar to other rigid support members in accordance with this disclosure, the rigid support member 410 can be machined or otherwise manufacture from plastic or metal. In another example, multiple harvesting modules can be assembled in a modular power generator. As illustrated in FIG. 5, three harvesting modules can be assembled in series, the harvesting modules having respective shape memory alloy members 520a-520c. As shown, similarly to other shape memory alloy members of this disclosure, each of the shape memory alloy members 520a-520c having a first end rigidly affixed to a rigid support member (e.g., rigid support member 510a, rigid support member 510b, or rigid support member 510c), and a second end rigidly affixed to a mechanism integrated into a hydraulic cylinder (e.g., hydraulic cylinder 530a, hydraulic cylinder 530b, or hydraulic cylinder 530c). As mentioned with reference to other harvesting module of the disclosure, such second ends can move along the longitudinal axis of their respective shape memory alloy members.

Figure 6:
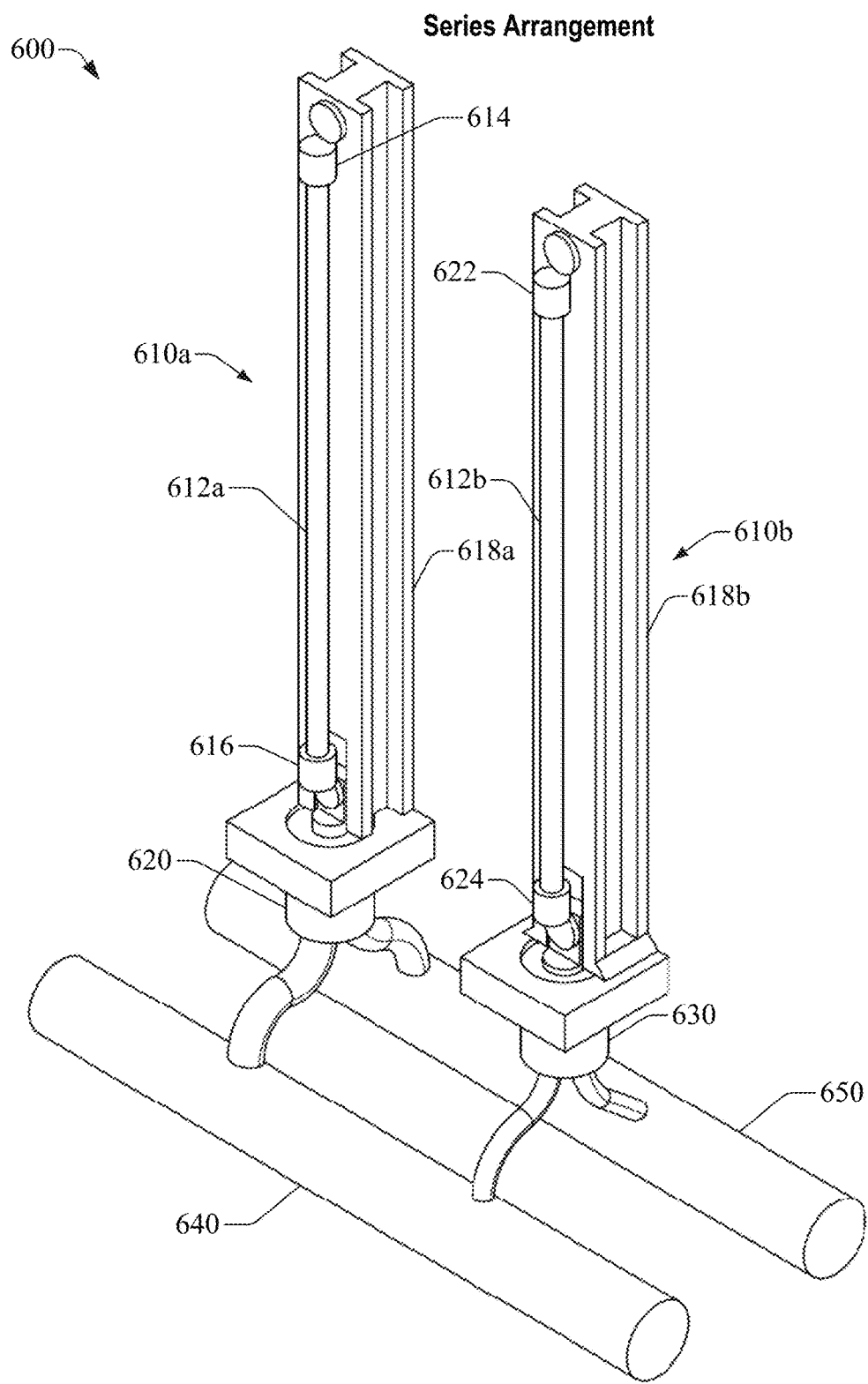
FIG. 6 illustrates an example of a multi-module assembly that can be utilized in a modular power generator in accordance with at least one or more embodiments of the disclosure.
Figure 7:
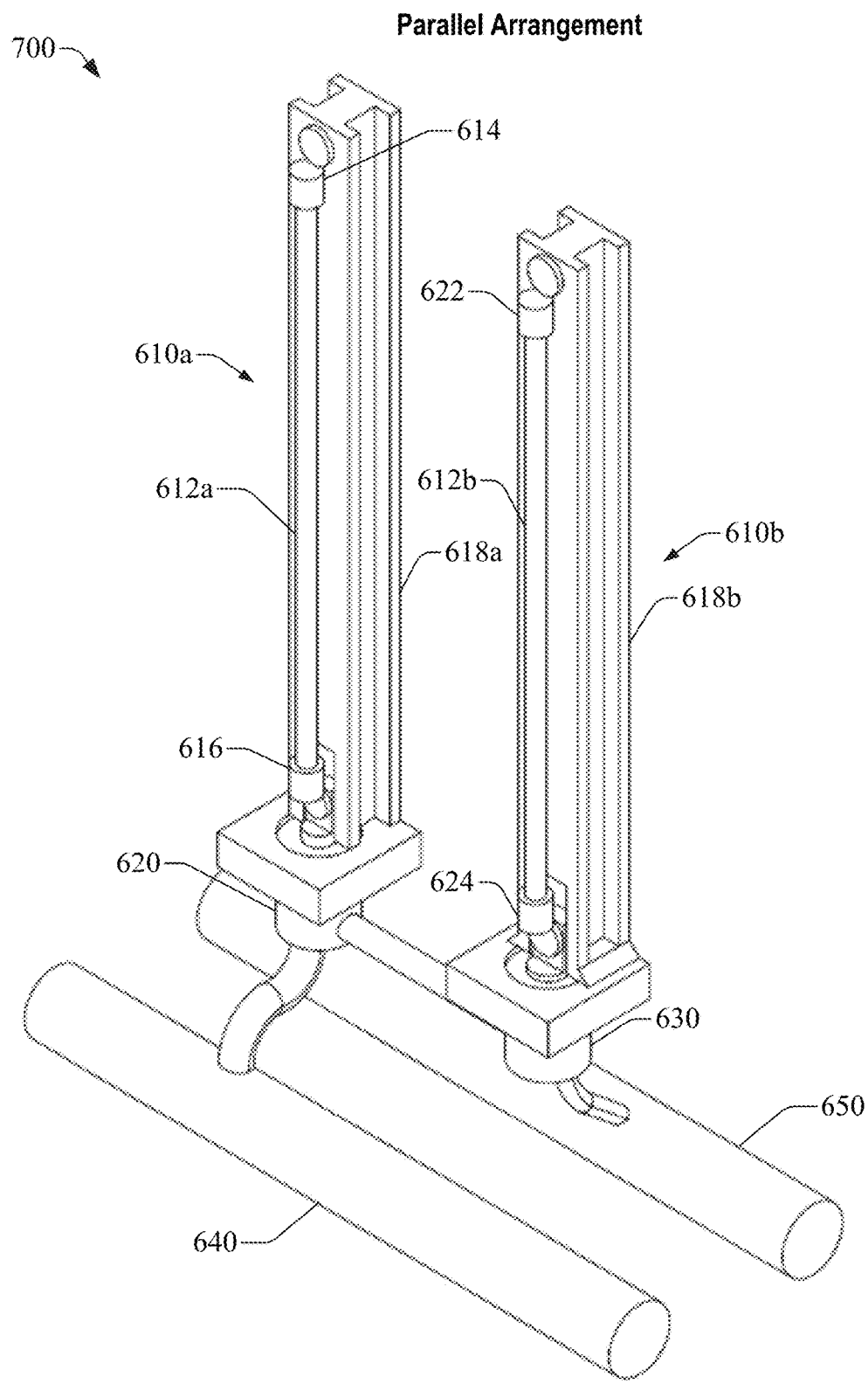
FIG. 7 illustrates another example of a multi-module assembly that can be utilized in a modular power generator in accordance with one or more embodiments of the disclosure.

FIGS. 6-7 illustrate two harvesting modules that can be utilized or otherwise leveraged in a modular power generator in accordance with embodiments of this disclosure. While the multi-module assemblies 600 and 700 include two harvesting modules, the disclosure is not so limited and, in some embodiments, multi-module assemblies having more than two harvesting modules also can be contemplated and included in modular power generators in accordance with this disclosure. As shown in FIG. 6, the two modules 610a and 610b can be arranged in series, which each module configured to receive unpressurized fluid via a conduit 640, and further configured to supply pressurized fluid to a conduit 650. More specifically, the harvesting module 610a can include a shape memory alloy member 612a having a first end 616 (which also may be referred to as proximal end) and an opposing end 614 (which also may be referred to as distal end), the shape memory alloy member 612a configured to transition to a tensile state at a defined transition temperature in accordance with aspects described herein. The end 614 of the shape memory alloy member 612a can be rigidly affixed (e.g., soldered, laser soldered, bolted, punched, or the like) to a rigid support member 618a of the harvesting module 610a. The harvesting module 610a also includes a mechanism mechanically coupled to the end 616 of the shape memory alloy member 612a, the mechanism configured to move a piston (or, in some embodiments, a plate or slab) in a hydraulic cylinder 620 in response to the shape memory alloy member 612a transitioning to the tensile state. As described herein, movement of the piston can yield an amount of pressurized fluid within the hydraulic cylinder 620, wherein the amount of pressurized fluid can be released via the conduit 650.

In addition, the example multi-module assembly 600 also includes a harvesting module 610b having a shape memory alloy member 612b having a first end 624 (which also may be referred to as a proximal end) and an opposing end 622 (which also may be referred to as distal end), the shape memory alloy member 612b configured to transition to a tensile state at a defined transition temperature in accordance with aspects described herein. The end 622 of the shape memory alloy member 612b can be rigidly affixed (e.g., soldered, laser soldered, bolted, punched, or the like) to a rigid support member 618b of the harvesting module 610b. The harvesting module 610b also includes a mechanism mechanically coupled to the end 624 of the shape memory alloy member 612b, the mechanism configured to move a piston (or, in some embodiments, a plate or slab) in a hydraulic cylinder 630 in response to the shape memory alloy member 612b transitioning to the tensile state. As described herein, movement of the piston can yield an amount of pressurized fluid within the hydraulic cylinder 630, wherein the amount of pressurized fluid can be released via the conduit 650. The transition temperature of the shape memory alloy member 612b in the harvesting module 610b can be different from or the same as the other transition temperature of the other shape memory alloy member 612a included in the harvesting module 610a.

As shown in FIG. 7, an example multi-module assembly can include the two harvesting modules 610a and 610b arranged in parallel. Thus, in some aspects, the harvesting module 610a can be configured to receive unpressurized fluid via a conduit 640. The harvesting module 610b can receive unpressurized fluid from a conduit that couples respective hydraulic cylinders of the harvesting modules 610a and 610b. Similarly, the harvesting module 610a can supply pressurized fluid via a hydraulic cylinder 620 of the module 610a to a second hydraulic cylinder 630 of the harvesting module 610b. The second hydraulic cylinder 630 also can supply pressurized fluid to a pressure storage vessel (e.g., a hydraulic accumulator) via the conduit 650.

Figure 8:
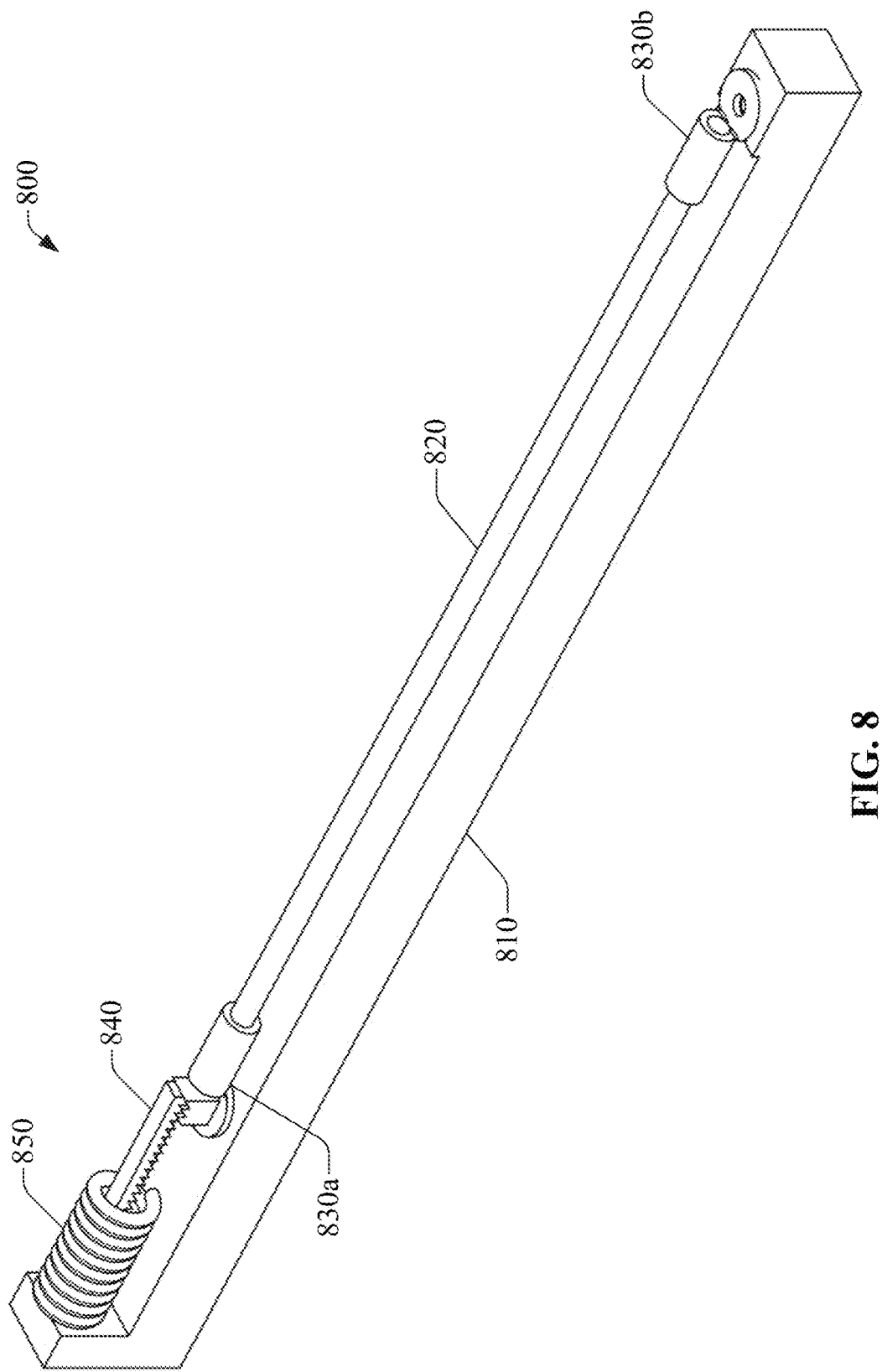
FIGS. 8-9 illustrate perspective views other example modules that can be utilized in a modular power generator in accordance with one or more embodiments of the disclosure.

FIG. 8 illustrates an example harvesting module 800 that can store elastic energy without reliance on a hydraulic cylinder or a pressure storage vessel. The example harvesting module 800 includes a spring 850 to store at least a portion of the elastic energy that can be generated in response to a deformation of a shape memory alloy member 820. As illustrated, the example harvesting module 800 can include a ratchet mechanism 840 configured to transfer the elastic energy from the shape memory alloy member 820 to the spring 850. The shape memory alloy member 820, the ratchet mechanism 840, and the spring 850 can be assembled in a single rigid support member 810. While the spring 850 is shown for the sake of illustration, it is noted that the disclosure is not limited in that respect and other elastic members (e.g., flexible bars) can be contemplated.

In some aspects, the ratchet mechanism 840 can permit energy transfer and/or storage. The shape memory alloy member 820 can be fixed at one end to the rigid support member 810. The free end of the nitinol element can be attached to the ratchet mechanism 840 so that each time the shape memory alloy member 820 cycles, the ratchet mechanism 840 moves. The motion of the ratchet mechanism 840 can be either linear or rotary. As described herein, the ratchet mechanism 840 can be attached to the spring 850 to gradually compress the spring responsive to successive transformation cycles. In some embodiments, the ratchet mechanism 840 can be configured to elevate a mass in response to a transition from a first tensile state to a second tensile state of the shape memory alloy member 820. The potential energy stored in the spring 850 can be released in response to a consumption criterion being satisfied, as described herein, providing work output through the use of clutches, brakes, or the like. In response to a transition from the second tensile state to the first tensile state (e.g., in response to cooling the shape memory alloy 820, a biasing mechanism (not depicted) can stretch or otherwise restore the shape memory alloy member 820 and can reset the ratchet mechanism 840 for another transition between tensile states that yield a contraction of the shape memory alloy member 820.

Figure 9:
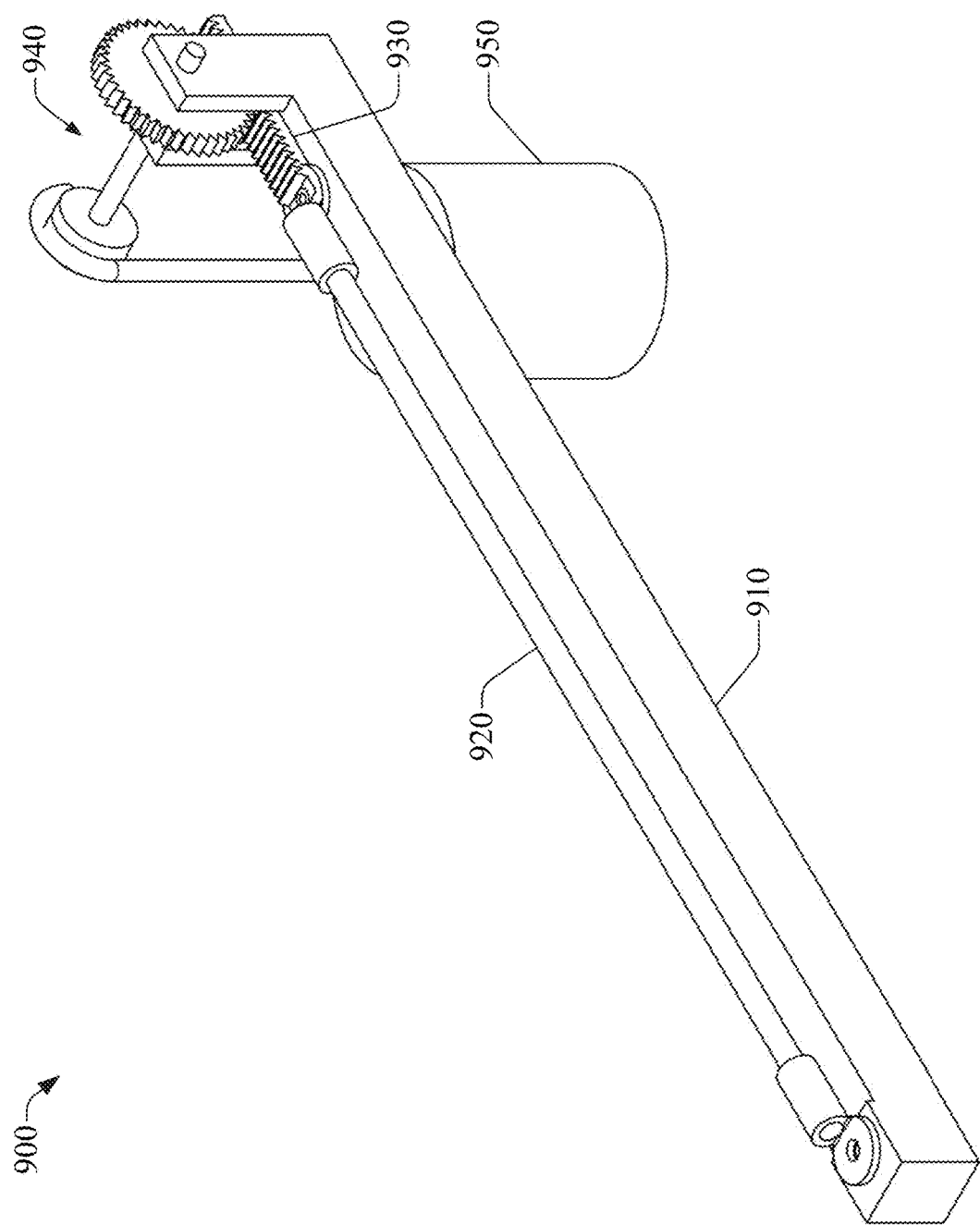

FIG. 9 illustrates an example harvesting module 900 that can that can store elastic energy without reliance on a hydraulic cylinder or a pressure storage vessel and can be utilized in a modular power generator in accordance with one or more embodiments of the disclosure. As illustrated, example harvesting module 900 can include a shape memory alloy member 920 having an end that is rigidly attached to a rack gear 930. The rack gear 930 is mechanically coupled to a pinion gear 940 configured to transfer at least a portion of the elastic energy generated in a deformation of the shape memory alloy member 920 to an elevated mass 950. As described herein, the deformation (e.g., a contraction) can be responsive to a transition from a first tensile state to a second tensile state of the shape memory alloy member 920. The pinion gear 940 can transfer the linear movement of the shape memory alloy member 920 to rotary movement that can change the position of the elevated mass 950, accumulating the at least a portion of the elastic energy in gravitational potential energy of the elevated mass 950. In some embodiments, work transmitted by rotary motion can be stored via a flywheel, spring, or the like. A rigid support member 910 can hold the shape memory alloy member 920, the rack gear 930, and the pinion gear 940. When needed, work can be extracted from these storage mechanisms through the use of brakes, clutches, etc.

A modular power generator that utilizes or otherwise relies on the example harvesting module 800 and the example harvesting module 900, a pneumatic bladder or cylinder built inside of the rigid support member 910. In some implementations, the end of the bladder can be attached to the end of the shape memory alloy member 920 that opposes the end mechanically coupled to the ratchet 840 or the rack gear 930, thus providing an extension force to reset a shape memory cycle.

Successive deformation cycles of a shape memory alloy member (e.g., a nitinol rod or a nitinol wire) can be driven by implementing a heating process of the atmosphere in a vicinity of the shape memory alloy member. In some embodiments, a surface of a harvesting module can be coated at least in part with an absorptive material. In some embodiments, the absorptive material can absorb light in a defined portion of the electromagnetic radiation spectrum, and can be deposited in a number of ways having different complexity. In some instances, the surface can be coated via evaporation or sputtering with the absorptive material or precursors thereof. The surface can oppose a second surface of the shape memory alloy member and, in response to illumination of the coated surface, the atmosphere in the vicinity of the shape memory alloy member can attain or exceed a transition temperature for such a member. Sunlight and/or a specific light source can illuminate the coated surface. The light source can be integrated into or otherwise assembled in the harvesting module. For instance, the light source can be attached to the harvesting module in a manner that illuminates the coated surface. Accordingly, regardless of the type of illumination, in some aspects, the shape memory alloy member can be caused to transition from a first tensile state to a second tensile state, resulting in a contraction of the shape memory alloy member in accordance with aspects described herein.

Figure 10:
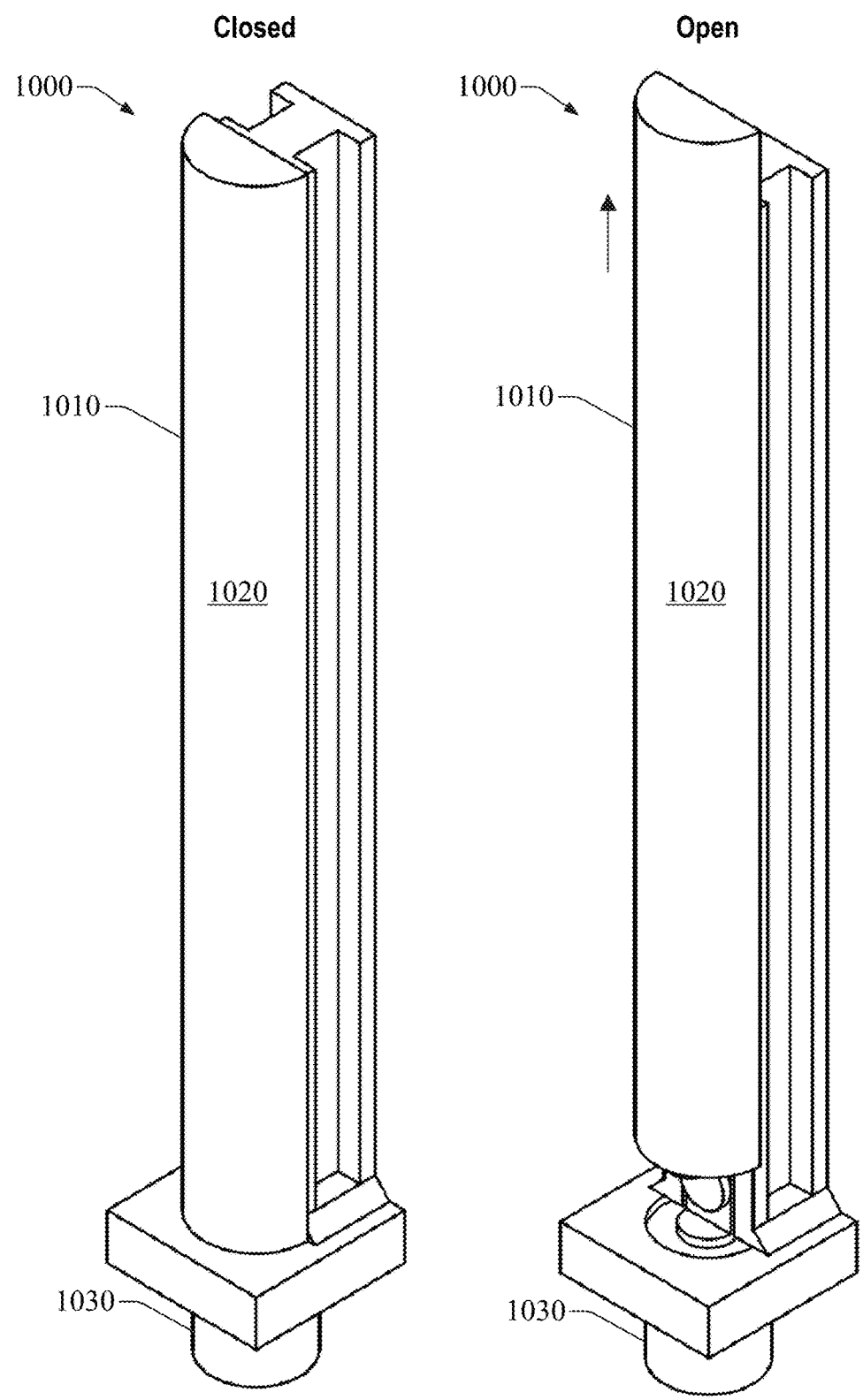
FIG. 10 illustrates perspective views of yet another example module that can be utilized in a modular power generator in accordance with one or more embodiments of the disclosure.

Besides the coating of a surface of a rigid support member in a harvesting module, some harvesting modules can be adapted to heat the atmosphere in a vicinity of a shape memory alloy member. FIG. 10 illustrates views of an example harvesting module 1000 that can be utilized in a modular power generator in accordance with one or more embodiments of the disclosure. As illustrated, the example harvesting module 1000 can include a movable enclosure 1010 having a surface 1020 coated at least in part with an absorptive material, such as carbon black or any other of the absorptive materials described herein. As illustrated, the movable enclosure 1010 defines an opening at an end of the movable enclosure 1010. In a closed position, the movable enclosure 1010 can heat a gas surrounding a shape memory alloy member (not depicted) included in the example harvesting module 1000. A temperature of the gas can attain or exceed a transition temperature for transformation of the shape memory alloy member, such a member can transition to a tensile state and, thus, can contract, moving a piston included in a hydraulic cylinder 1030 and transferring at least a portion of the elastic energy associated with the contraction, in accordance with aspects described herein. In some aspects, the movable enclosure 1010 is configured to move along a direction in which the rigid support member extends from the proximal end to the opposing distal end. The movement of the movable enclosure is responsive to the transition to the tensile state, and thus, the movable enclosure 1010 can open releasing the heated gas, cooling the environment of the shape memory alloy member, which cooling can result in a reset of the deformation cycle of the shape memory alloy member. In some embodiments, the movable enclosure can be mechanically coupled, (e.g., attached via a rigid or semi-rigid member), to a movable end of the hydraulic cylinder 1030. Therefore, the movable enclosure 1010 can move in response to movement of the shape memory alloy member (not depicted) associated with a deformation (e.g., a contraction) responsive to a deformation transition associated with a transition to the tensile state.

Figure 11:
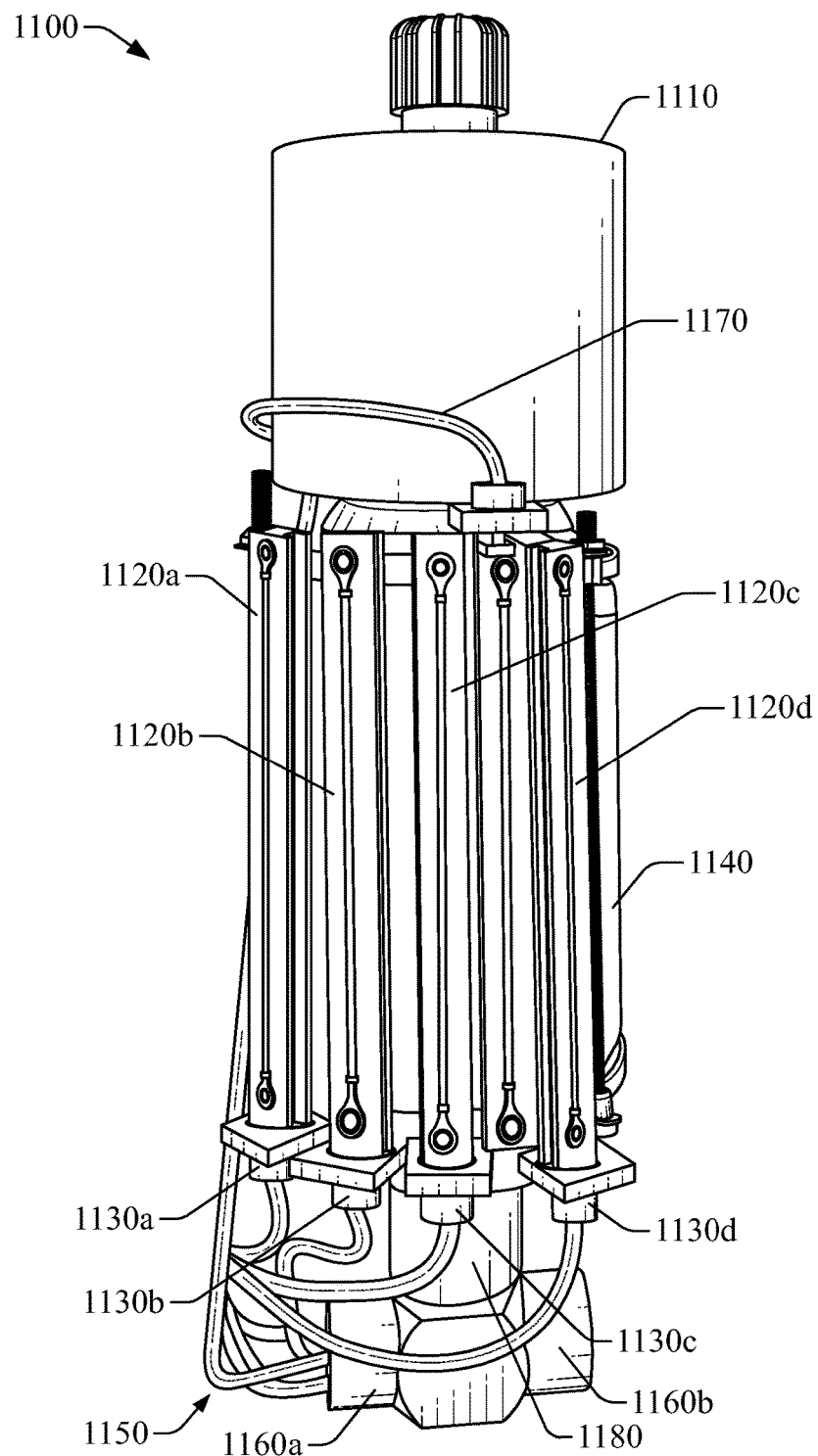
FIG. 11 illustrates an example of a modular power generator in accordance with one or more embodiments of the disclosure.

FIG. 11 illustrates an example of modular power generator 1100 in accordance with one or more embodiments of the disclosure. As illustrated, the modular power generator 1100 includes four plastic harvesting modules 1120a, 1120b, 1120c, and 1120d, each having a nitinol wire and a hydraulic cylinder at an end of the harvesting module. Each of the nitinol wires can have at least one defined transition temperature associated with a respective transition between tensile states of the nitinol wire. Thus, as shown, four hydraulic cylinders 1130a, 1130b, 1130c, and 1130d are included in the modular power generator 1100. In addition, a steel hydraulic line protrudes from each of the hydraulic cylinders 1130a, 1130b, 1130c, and 1130d, forming tubing 1150. In one aspect, the tubing 1150 can be mechanically coupled and/or fluidically coupled to the conduit 1160a, which can include a valve in accordance with aspects described herein.

Similar to other modular power generators in accordance with aspects of this disclosure, the modular power generator 1100 includes a vessel 1110 configured to supply unpressurized fluid (e.g., oil, which can be biodegradable or otherwise) to each of the hydraulic cylinders 1130a, 1130b, 1130c, and 1130d. To that end, in some aspects, the vessel 1110 can be mechanically coupled and/or fluidically coupled to a conduit 1180 via another conduit 1170, where the conduit 1180 is configured to release or otherwise transport an amount of unpressurized fluid to at least one of the hydraulic cylinders 1130a, 1130b, 1130c, and 1130d. In addition, the modular power generator 1100 includes a hydraulic accumulator 1140 configured to receive pressurized fluid from at least one of the hydraulic cylinders 1130a, 1130b, 1130c, and 1130d. The hydraulic accumulator 1140 also is configured to supply an amount of pressurized fluid via the conduit 1160b, which can include a valve, in accordance with aspects described herein.

The modular power generator 1100 also includes stability shafts, each of which can be bolted to a plastic stability frame coupled to a region proximate to an end of the hydraulic accumulator 1140.

Figure 12:
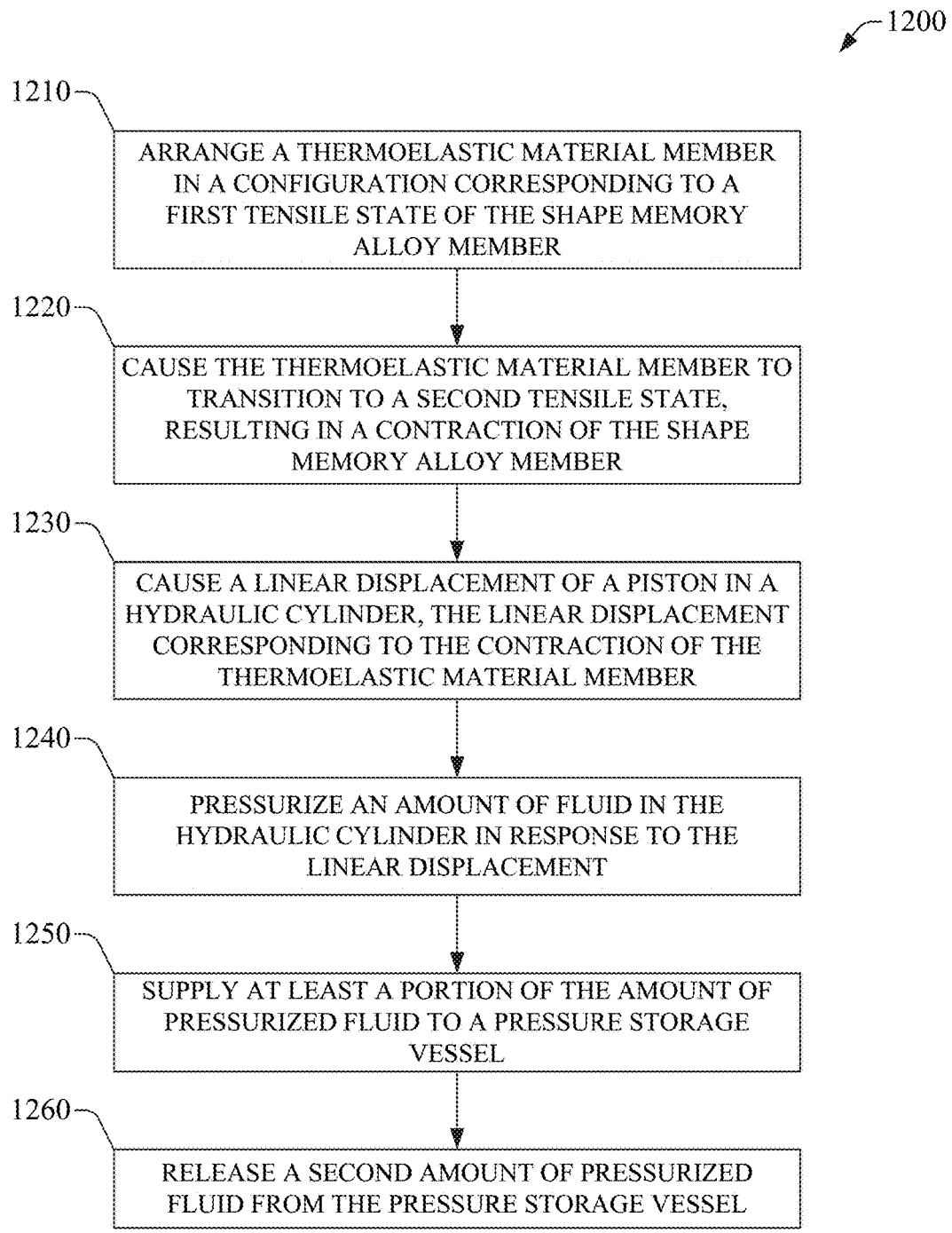
FIG. 12 illustrates an example method for power generation in accordance with one or more embodiments of the disclosure.

In view of the aspects described herein, examples of a technique for management of optical noise in optical spectroscopy in accordance with at least certain aspects of the disclosure can be better appreciated with reference to the flowchart in FIG. 12. For purposes of simplicity of explanation, the examples of the techniques disclosed herein are presented and described as a series of blocks (with each block representing an action or an operation in a method, for example). However, it is to be understood and appreciated that the disclosed techniques (e.g., process(es), procedure(s), method(s), and the like) are not limited by the order of blocks and associated actions or operations, as some blocks may occur in different orders and/or concurrently with other blocks from that which are shown and described herein. For example, the various techniques of the disclosure can be alternatively represented as a series of interrelated states or events, such as in a state diagram. Furthermore, not all illustrated blocks, and associated action(s) or operation(s), may be required to implement a technique in accordance with one or more aspects of the disclosure. In addition, two or more of the disclosed techniques can be implemented in combination with each other, to accomplish one or more features and/or advantages described herein.

It should be appreciated that, in certain embodiments, at least a portion of the techniques of the disclosure can be retained on an article of manufacture, or computer-readable storage medium in order to permit or facilitate transporting and transferring such techniques to a computing device (such as a microcontroller, a programmable logic controller, a programmable logic relay, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute instructions retained in a memory, or any computer-readable or machine-readable storage medium, to implement the techniques described herein. The instructions can embody or can constitute at least a portion of the techniques, and thus can provide a computer-executable or machine-executable framework to implement the techniques described herein.

FIG. 12 presents a flowchart of an example of a method 1200 for power generation according to at least some embodiments of the disclosure. In some embodiments, at least a portion of the example method 1200 can be implemented by a modular power generator in accordance with this disclosure (e.g., modular power generator 100 and/or power modular generator 1100). At block 1210, a thermoelastic material member can be arranged in a configuration corresponding to a first tensile state of the thermoelastic material. As described herein, in some examples, the thermoelastic material member can be embodied in or can include a rod, a wire, or any other type of member that can be oriented in a defined crystallographic orientation that can favor the presence of uniaxial strain in the member. In addition, the thermoelastic material can be embodied in or can include a shape memory alloy, such as a nickel-titanium alloy, a nickel-copper-titanium alloy (where at least an amount of nickel in a precursor nickel-titanium alloy have been replaced with copper), and the like. At block 1220, the thermoelastic material member is caused to transition to a second tensile state, resulting in a contraction of thermoelastic material member. In some embodiments, causing the transition to the second tensile state include increasing the temperature heating the thermoelastic material member to a temperature equal to or greater than a defined transition temperature. At block 1230, a linear displacement of a piston in a hydraulic cylinder (e.g., a single-acting hydraulic cylinder) can be caused, for example, in response to the contraction of the thermoelastic material member (e.g., a rod formed from or otherwise including nitinol). As described herein (see, e.g., FIG. 2), in order to cause such a linear displacement, an end of the thermoeleastic material member can be mechanically coupled to the piston. In one example, the mechanical coupling can be accomplished via a nearly rigid member that displaces the piston along a longitudinal axis of the thermoelastic material member in response to the contraction.

At block 1240, an amount of fluid in the hydraulic cylinder can be pressurized in response to the linear displacement. The fluid can include a gas, a liquid, or a combination thereof. In some aspects, the amount of fluid can be pressurized in response to reducing a volume occupied by the fluid within the piston. At block 1250, at least a portion of the amount of pressurized fluid can be supplied to a pressure storage vessel (e.g., a hydraulic accumulator). As described herein, in some aspects, the hydraulic cylinder can include an outlet opening fluidically coupled to the hydraulic accumulator, which can be configured to receive pressurized fluid. Rigid or flexible tubing and/or other types of conduits can provide such a coupling. Similarly, in some aspects, the pressure storage vessel can receive the amount of pressurized fluid via an inlet opening of such a vessel.

At block 1260, a second amount of pressurized fluid can be released from the pressure storage vessel. In some aspects, as described herein, a valve can be coupled (e.g., mechanically coupled and/or fluidically coupled) to the pressure storage vessel and configured to be opened in response to a release criterion (e.g., a power consumption criterion or rule) being satisfied. The second amount of pressurized fluid can be released via, for example, an outlet opening of the pressure storage vessel. In some embodiments, a control unit (e.g., a programmable logic controller or another type of computing device) can implement logic to determine that the release criterion is satisfied and, in response, can open the valve for the release of the second amount of pressurized fluid. In addition or in other embodiments, a mechanism can passively control the opening (and shutting) of the valve for the release of the second amount of pressurized fluid.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated onto a general purpose computer, special purpose computer, or other programmable information processing apparatus to produce a particular machine, such that the operations or functions specified in flowchart block(s) can be implemented in response to execution at the computer or processing apparatus.

Unless otherwise expressly stated, it is in no way intended that any technique, protocol, procedure, process, or method set forth herein be construed as requiring that its acts, operations, or steps be performed in a specific order. Accordingly, where a process or method claim does not actually recite an order to be followed by its acts, operations, or steps, or it is not otherwise specifically recited in the claims or descriptions of the subject disclosure that the steps are to be limited to a specific order, it is in no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification or annexed drawings, or the like.

As used in this application, the terms "component," "environment," "system," "platform," "architecture," "interface," "unit," "member," "module," and the like are intended to refer to an entity related to an operational apparatus with one or more specific functionalities. Such an entity may be either hardware, software, software in execution, or a combination thereof. As an example, a component can be an apparatus that provides specific functionality by means of mechanical parts, without reliance on electronic or electro-mechanical parts. As yet another example, a component may be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. The terms "component," "environment," "system," "platform," "architecture," "interface," "unit," "module" can be utilized interchangeably and can be referred to collectively as functional elements.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, apparatuses, devices, and techniques that can provide power generation based on materials that can be controllably transitioned between thermodynamic phases having different crystalline structures and respective tensile states. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. An apparatus, comprising:
    a control unit;
    a first module comprising:
        a shape memory alloy member, with an elongated cylindrical rod-shape, having a proximal end and an opposing distal end, the shape memory alloy member configured to transition to a tensile state at a defined transition temperature,
        a mechanism comprising a piston configured to move in response to the shape memory alloy member transitioning to the tensile state, resulting in a first amount of pressurized fluid within the mechanism and a reduction of volume in the mechanism,
        a movable enclosure coated in part with an absorptive material, wherein when the movable enclosure is in a closed position, the movable enclosure encloses the shape memory alloy member and gas is heated adjacent to the shape memory alloy member, and wherein when the movable enclosure is in an open position, the heated gas is released and the shape memory alloy member cools, and
        a laser welded ring terminal mechanically coupling the proximal end of the shape memory alloy member to the mechanism;
    a valve coupled to a hydraulic cylinder containing the mechanism, the valve configured to release a portion of the first amount of pressurized fluid in response to a signal or instruction from the control unit;
    a second module that contains a second amount of pressurized fluid, the second module configured to receive the portion of the first amount of pressurized fluid;
    a second valve coupled to the second module, the second valve configured to release a second portion of the second amount of pressurized fluid in response to a signal or instruction from the control unit; and
    a power generator configured to receive the second portion of the second amount of pressurized fluid, resulting in an amount of power being produced at the power generator.

2. The apparatus of claim 1, further comprising a third module comprising:
    a second shape memory alloy member having a second proximal end and a second opposing distal end, the second shape memory alloy member configured to transition to a second tensile state at a second defined transition temperature; and
    a second mechanism mechanically coupled to the second proximal end of the second shape memory alloy member, the second mechanism configured to move a second piston in a second hydraulic cylinder in response to the second shape memory alloy member transitioning to the second tensile state, resulting in a third amount of pressurized fluid within the second hydraulic cylinder.

3. The apparatus of claim 1, further comprising:
    a vessel that supplies an unpressurized fluid; and
    a third valve coupled to the vessel, the third valve configured to release a third amount of the unpressurized fluid to the hydraulic cylinder.

4. The apparatus of claim 1, wherein the shape memory alloy member comprises a rod comprising a nickel-titanium alloy, and wherein the defined transition temperature is in a range from about 5 degrees Celsius to about 30 degrees Celsius.

5. The apparatus of claim 4, wherein the rod is crystalline and has a longitudinal axis oriented along a <1,0,0> crystalline direction.

6. The apparatus of claim 4, wherein the rod has a diameter in the range from about 1.0 mm to about 8.0 mm, and wherein the rod has a length in the range from about 100.0 mm to about 5000.0 mm.

7. The apparatus of claim 1, wherein the shape memory alloy member comprises a rod comprising a nickel-copper-titanium alloy, wherein a concentration of copper is at most about 20%.

8. The apparatus of claim 1, wherein the first module comprises:
    a rigid support member; and a second titanium ring terminal rigidly affixed to the opposing distal end of the shape memory alloy member, the second ring terminal comprising the titanium alloy.

9. The apparatus of claim 8, wherein the first module has a surface coated at least in part with an absorptive material, the surface opposes a second surface of the shape memory alloy member.

10. The apparatus of claim 8, wherein the first module further comprises a movable enclosure comprising a rotating louver.

11. The apparatus of claim 8, wherein the first module further comprises a movable enclosure, wherein the movable enclosure defines an opening at an end of the movable enclosure and is configured to move along a direction in which the rigid support member extends from the proximal end to the opposing distal end, movement of the movable enclosure is responsive to the transition to the tensile state.

12. A method, comprising:
  causing shape memory alloy members to transition to respective tensile states, resulting in respective contractions of the shape memory alloy members;
  causing, for each shape memory alloy member in the shape memory alloy members, a respective linear displacement of a respective piston in a respective hydraulic cylinder, the respective linear displacement caused by the contraction of the each shape memory alloy member, wherein the respective linear displacement of the respective piston decreases volume in the respective hydraulic cylinder, wherein a respective movable enclosure coated in part with an absorptive material encloses each shape memory alloy member and gas is heated adjacent to each shape memory alloy member, and wherein when the respective movable enclosures are in an open position, the heated gas is released and each shape memory alloy member cools;
  pressurizing, for the each shape memory alloy member, a respective amount of fluid in the respective hydraulic cylinder in response to the respective linear displacement;
  supplying the respective amount of pressurized fluid to a pressure storage vessel;
  releasing, in response to a signal or instruction from a control unit, at least a portion of the respective amount of pressurized fluid from the pressure storage vessel to a power generator; and
  causing the power generator to receive the portion of the respective amount of pressurized fluid, resulting in an amount of power being produced at the power generator.

13. The method of claim 12, further comprising releasing a second amount of pressurized fluid from the pressure storage vessel.

14. The method of claim 12, wherein the causing the shape memory alloy member to transition to the tensile state comprises heating the shape memory alloy to a temperature greater than a defined transition temperature.

15. An apparatus, comprising:
  a control unit;
  a first module comprising:
    respective thermoelastic rods, with an elongated cylindrical shape, each of the respective thermoelastic rods having a proximal end and an opposing distal end, and each of the respective thermoelastic rods configured to transition from a first tensile state to a second tensile state at respective defined transition temperatures;
    respective rigid support members associated with the respective thermoelastic rods;
    laser welded ring terminals, each of the laser welded ring terminals mechanically coupling each of the rigid support members to a respective opposing distal end of a thermoelastic rod;
    respective movable enclosures coated in part with an absorptive material, wherein when each movable enclosure is in a closed position, each movable enclosure encloses a respective thermoelastic rod and gas is heated adjacent to the respective thermoelastic rod, and wherein when the movable enclosure is in an open position, the heated gas is released and the respective thermoelastic rod cools, and
    respective mechanisms associated with the respective thermoelastic rods, each of the respective mechanisms mechanically coupled to a respective proximal end of a respective thermoelastic rod, wherein the respective proximal end is rigidly affixed to a respective mechanism, wherein each of the respective mechanisms comprises a piston configured to move in response to the respective thermoelastic rod transitioning to the tensile state, resulting in respective first amounts of pressurized fluid within the respective mechanisms;
  a valve coupled to hydraulic cylinders containing the respective mechanisms, the valve configured to release a portion of the first amount of pressurized fluid;
  a second module that contains a second amount of pressurized fluid, the second module configured to receive the portion of the first amount of pressurized fluid;
  a second valve coupled to the second module, the second valve configured to release the portion of the first amount of pressurized fluid in response to a signal or instruction from the control unit; and
  a power generator configured to receive the second portion of the second amount of pressurized fluid, resulting in an amount of power being produced at the power generator.

16. The apparatus of claim 15, wherein at least one of the respective thermoelastic rods comprises at least one of a rod comprising a nickel-titanium alloy, and wherein the defined transition temperature is in a range from about −100 degrees Celsius to about 160 degrees Celsius.

17. The apparatus of claim 16, wherein the thermoelastic rods comprises a shape memory polymer.

18. The apparatus of claim 16, wherein the rod has a diameter in the range from about 1.0 mm to about 8.0 mm, and wherein the rod has a length in the range from about 100.0 mm to about 5000.0 mm.

19. The apparatus of claim 17, wherein the shape memory polymer comprises a nickel-copper-titanium alloy, wherein a concentration of copper is at most about 20%.

* * * * *